Jan. 11, 1927.  J. E. DESMOND  1,614,233
AUTOMOBILE PARKING DEVICE
Filed Oct. 10, 1925   3 Sheets-Sheet 1
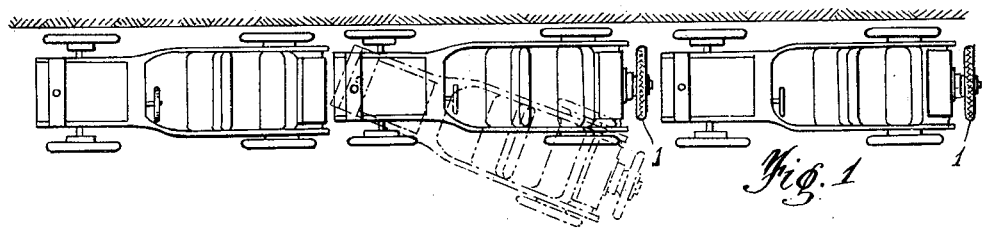
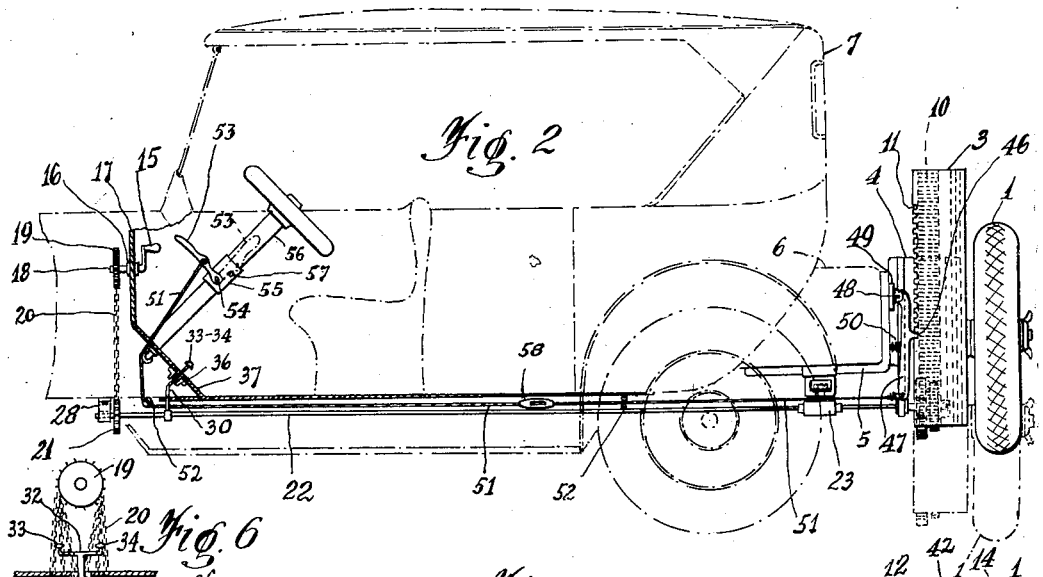
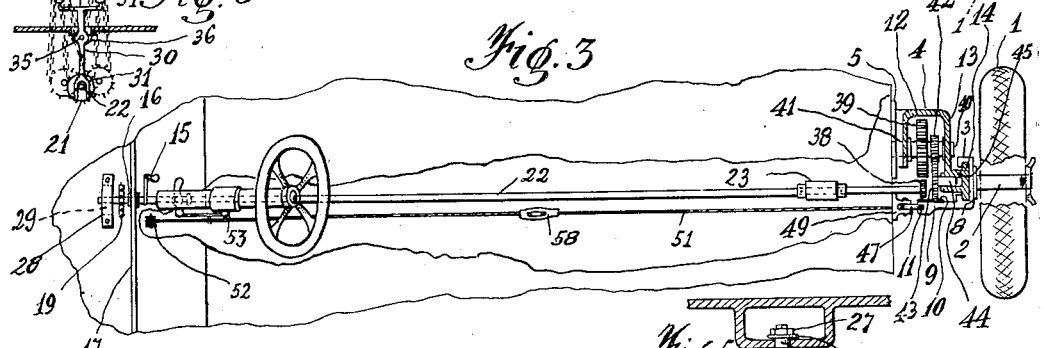
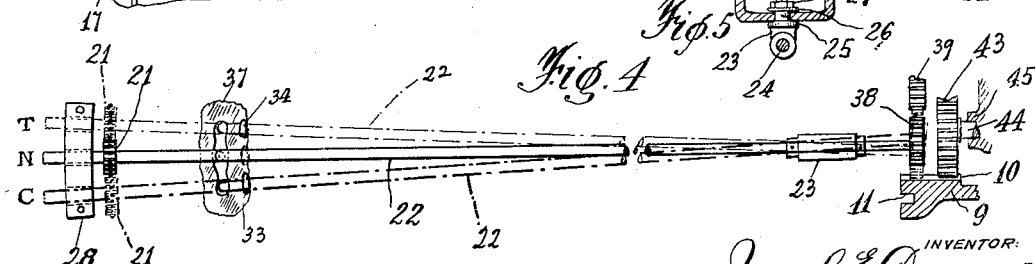
INVENTOR:
Joseph E. Desmond Jan. 11, 1927.  
J. E. DESMOND  
1,614,233  
AUTOMOBILE PARKING DEVICE  
Filed Oct. 10 1925  3 Sheets-Sheet 2
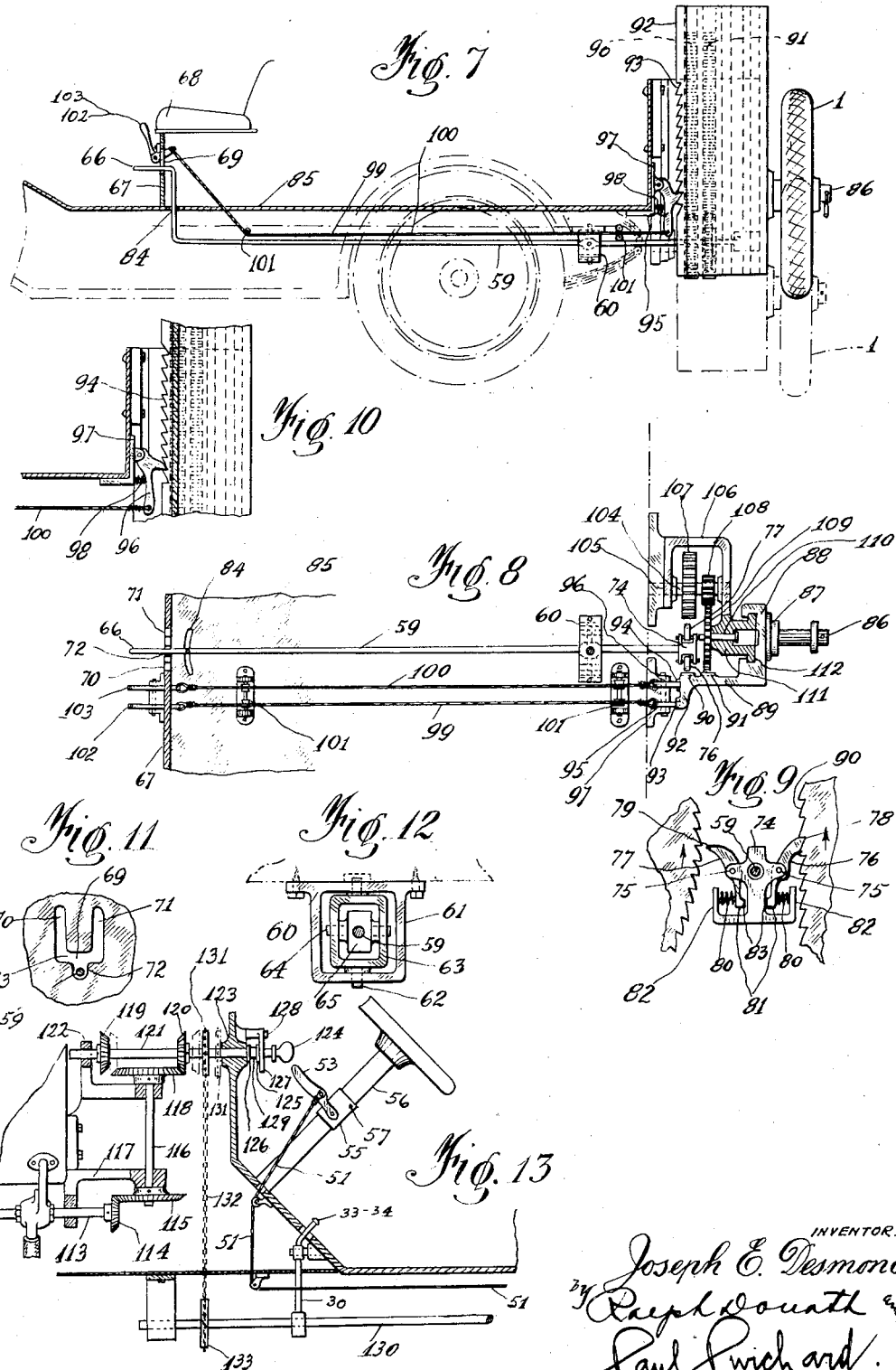

Jan. 11, 1927.

J. E. DESMOND 1,614,233

AUTOMOBILE PARKING DEVICE

Filed Oct. 10, 1925   3 Sheets-Sheet 3

INVENTOR:
Joseph E. Desmond

Patented Jan. 11, 1927.

1,614,233

UNITED STATES PATENT OFFICE.

JOSEPH E. DESMOND, OF SWISSVALE, PENNSYLVANIA, ASSIGNOR OF ONE-HALF TO CHARLES M. CLARKE, OF PITTSBURGH, PENNSYLVANIA.

AUTOMOBILE PARKING DEVICE.

Application filed October 10, 1925. Serial No. 61,826.

This invention relates to automobile parking devices and more in particular to a method of utilizing the spare tire or spare wheel of an automobile for parking same.

The primary object of this invention is to provide for the adaptation of the spare-tire or spare-wheel of an automobile for parking or extricating the latter out of very crowded spaces and substantially within the own length of the automobile. Another object is to provide means whereby said device may be used for jacking up the rear end of an automobile for the purpose of applying or removing tires. Still another object of this invention is to provide means operated from the seat of the automobile, whereby the latter may be prevented from skidding when travelling down steep and slippery roads. Yet another object is to provide a device which enables the use of the spare tire for turning an automobile fully around in a very restricted space. Additional features and advantages of this invention will appear from the following description considered in connection with the accompanying drawings forming a part of this application and in which:

Fig. 1 shows a crowded parking condition encountered very frequently in cities, in which condition my invention may be applied to advantage.

Fig. 2 is a fractional side elevation of an automobile in which is incorporated one type of construction of my invention.

Fig. 3 is a top plan view of the operating mechanism shown in Fig. 2.

Fig. 4 is an enlarged view of the operating-shaft and gearing used in Fig. 2.

Fig. 5 is a detail view showing one type of shaft-support adapted to the construction illustrated in Fig. 2.

Fig. 6 is a detail view of a shaft shifting mechanism, also used in Fig. 2.

Fig. 7 is a fragmentary side elevation of an automobile provided with a modified construction of my invention.

Fig. 8 is a top plan view of the operating mechanism used in Fig. 7.

Figs. 9, 10, 11 and 12 show various constructive details of parts used in Fig. 7 and which shall be described more fully.

Fig. 13 shows a modification of the operating mechanism represented in Fig. 2, wherein the power required for the operation is derived from the automobile engine.

Fig. 14 is a front elevation, partly in section, of still another modification of my invention.

Fig. 15 represents a cross-section taken on line 15—15, in Fig. 14.

Fig. 16 is a similar view to Fig. 15, illustrating the gears in a different meshing engagement.

Fig. 17 is a diagrammatic development of the gearing used in Fig. 14, intended to better illustrate the location and operation of the various gears used therein.

Fig. 18 is a miniature rear view of an automobile supplied with the last mentioned modified device, with the rear end and rear wheels raised above the ground.

Fig. 19 is a cross-section taken on line 19—19 in Fig. 15.

Reference being had to the various drawings, each modification will hereafter be described in detail. However, it may be stated in advance that the common purpose of each modification is to provide means whereby the spare-tire, or spare-wheel, and its support may be lowered or raised at will to serve as what may be called the "auxiliary wheel" of an automobile, whereby the latter may be raised a required amount to lift the rear wheels off the ground and permit the manual shifting of the automobile sideways into a crowded parking space by a man pushing on the body of the automobile.

In the construction shown in Figs. 3 to 6, the spare-tire 1 is removably mounted on a trunnion or spindle 2 secured to the rack-member 3 which is slidably mounted on a stationary housing 4 secured in any desired manner upon a frame 5 which partly surrounds the gasoline tank 6 of the automobile 7, or otherwise, to properly support the weight of the car when the rack member 3 is lowered.

The rack-member 3 comprises the guide-portion 8 and the right angularly disposed rack-portion 9 provided on its inner face with the rack-teeth 10 and on the front edge with the catch-notches 11. The stationary housing is composed of the U-shaped portion 12 having at one of its legs 13 the T-shaped or other suitably formed guide-member 14 which is adapted to engage the guide-portion 8 of the rack-member.

The latter is raised or lowered from the seat of the automobile by means of a crank 15 which is mounted for rotation in a bearing-support 16 fastened to the partition 17 of the automobile. At the other end of the crank-shaft 18 is keyed the chain-sprocket 19 which transmits its motion by means of the drive-chain 20 to the lower chain-sprocket 21, mounted adjacent the forward end of the operating-shaft 22. This shaft is mounted for rotation in a special swivel-bearing 23 which allows the shaft to be swung right or left in a horizontal plane. As shown in the drawing, the swivel-bearing consists of a journal 24 having a swivel-pin 25 which engages a suitable aperture provided in an extension cast on the frame 5 and is held thereon for rotation by means of the washer 26 and the nut 27. The shaft is guided at the forward end by a bracket 28 in which is provided a horizontal slot 29 which permits the sideways shifting of said shaft. The shifting of the latter is performed by means of the T-shaped pedal-lever illustrated in Fig. 6. As shown therein, said lever comprises a vertical leg 30, having at its lower end the fork 31 engaging the sides of the operating-shaft 22 and a horizontal arm 32 symmetrically disposed upon said leg and terminating with the two pedals 33 and 34. The pedal-lever is rockably mounted on a fulcrum-pin 35 secured in the support 36 fastened on the foot-board 37 of the automobile.

At the rear end of the operating-shaft is keyed a gear 38 which is adapted to engage the teeth 10 of the rack 9, but which is normally out of engagement therewith. This gear is also adapted to mesh with a larger gear 39 mounted on a shaft 40 running in suitable bearings 41 provided in the stationary housing 4. A second gear 42 is keyed upon the shaft 40 to mesh with another large gear 43, the shaft 44 of which is journaled in a bearing 45 provided in the leg 13 of the stationary housing. The gear 43 is always in mesh with the rack-teeth 10.

In the normal running position of the automobile, the spare-wheel 1 and the rack-member 3 are raised to clear the ground a sufficient amount and the rack-member is held in its raised position by means of the pin, or tooth, 46 formed on a lever 47 and engaging the catch-notches 11. This lever is fulcrumed at its upper end by means of a pin-connection 48 mounted in a special bracket 49 secured on the frame 5 and is at all time under the action of a coiled spring 50 the tendency of which is to press the tooth 46 into engagement with the catch-notches. This engagement may be broken by means of the pull-cable 51 which is attached at the lower end of the lever and which is guided by means of suitable guide-rollers 52 fastened on the under-side of the automobile. The other end of this cable is tied to a lever 53 which is fulcrumed at 54 on a sleeve-clamp 55, suitably located on the steering-post 56 of the automobile. As will be seen from Fig. 3 especially, when this lever is pulled up in the position shown in dot and dash lines, the lever 47 will be pulled back and the pin 46 will leave the catch-notches 11 thereby allowing the spare-wheel to fall rapidly to the ground. A stop-pin 57 is preferably provided on the sleeve-clamp to afford a self-locking stop for the lever 47 when in its raised position, and a turn-buckle 58 is supplied to maintain the proper tension in the pull-cable.

Special reference being had to Fig. 4, it will be noted that when the operating-shaft is held in the neutral or normal position indicated by the letter "N" its gear 38 is free and occupies an intermediate position between the rack 9 and the gear 39. When in this position of the operating-shaft, the spare-wheel and rack-member are, of course, held in their raised position on the automobile by means of the pin 46.

If the spare-wheel be on the ground and it be desired to raise it, the operating shaft is shifted to the position "T" by pressing down to the right the pedal 33, thus bringing the gear into mesh with the rack-teeth 10. The crank 15 is then turned in the proper direction to effect the raising of the spare-wheel.

When the rear end of the automobile is to be raised for the purpose of pushing the latter into a crowded parking place, or for jacking up the rear wheels for renewing either of the rear tires, the spare-wheel is first dropped to the ground by setting the gear 38 into the neutral position and releasing the catch-pin 46 by means of the lever 53. The pedal 34 is then pressed to the left down to bring the gear 38 into mesh with the large gear 39, position C, and the whole train of gears is actuated by turning the crank 15. As will be readily understood, the purpose of introducing the speed reducing and power multiplying train of gears is to enable the lifting of the rather considerable weight of the rear end of the automobile on rack member 3 by applying only a moderate force at the crank 15. When the spare-wheel and connected parts alone are raised, their lesser weight permits of a direct and faster connection between the gear 38 and the rack, obtained by shifting the operating-shaft into the position "T"

In the modified construction shown in Figs. 7 to 12, the lifting or lowering of the spare-wheel or the rear end of the automobile by adjustment of the rack member is performed by means of a vertically movable lever operable directly from the seat of the automobile. Referring to these figures it will be noted that the construction shown therein comprises an operating-lever 59 which is fulcrumed underneath the automobile in a gimbal-like support 60 which allows for up and down and right to left movements of said lever. This support is mounted in any desired manner under the body of the automobile and consists of the stationary housing 61 in which is rotatably mounted on the vertical pivots 62 the rectangular frame 63. The operating-lever is fulcrumed for vertical rocking movement in the latter by means of the trunnions 64 placed on each side of the enlargement 65 formed on said lever. The forward end of the operating-lever has a double bend to produce an operating handle 66 whereby the lever is manipulated. This handle extends outwardly of the front board 67 of the seat 68 and is within easy reach of the driver, and is guided for proper operation by means of the fork-shaped aperture 69 having two upwardly directed parallel slots 70 and 71, a short intermediate downwardly disposed slot or notch 72, all connected by the horizontal slot 73. A curved slot 84 is also provided in the floor 85 to allow the sidewise moving of the operating-lever.

At the rear end of the operating-lever is secured the substantially T-shaped head 74 in which are mounted on pins 75 the two oppositely directed pawls 76 and 77 the tips 78 and 79 of which are normally forced outward by the action of the coil-springs 80 inserted between the tails 81 of the pawls and the lugs 82 formed on said head. Suitable stops 83 limit the outward reach of said tips.

The spare-wheel 1 is removably mounted on a horizontal trunnion or spindle 86 secured on the rack-member 87 which comprises a guide-portion 88 and the rack-portion 89. On the inner face of the latter is provided a vertical row of ratchet-teeth 90 adapted to be engaged by the pawl 76 and a rack 91; whereas on the front face 92 there are positioned two parallel rows of oppositely directed ratchet-teeth 93 and 94, the former being adapted to prevent the downward movement of the rack-member and the latter preventing the upward movement thereof. The ratchet-teeth 93 are engaged by a pawl 95 and the teeth 94 by another pawl 96; both pawls being rockably mounted on a common support 97 fastened in any desired manner to the frame of the automobile. These pawls are normally forced into engagement with their respective ratchet-teeth by the agency of the coil-springs 98 and are respectively operated from the seat of the automobile by means of the pull-cables 99 and 100 suitably guided on rollers 101 conveniently placed underneath the automobile and operated from the bell-crank levers 102 and 103 suitably mounted on the front-board 67.

In the normal running condition of the automobile, the spare-wheel 1 and the rack-member 87 are held in their raised position by the pawl 95 and the ratchet-teeth 93, and the operating-lever 59 rests in the neutral slot 72, so that both pawls 76 and 77 are disengaged.

To lower the spare-wheel to the ground, the pawl 95 is pulled out of engagement with the ratchet-teeth 93 by means of the lever 102, thereby allowing the wheel to fall rapidly to the ground under its own weight. However, if the spare-wheel must be raised, the pawl 96 is first disengaged from its set of ratchet-teeth by working the lever 103; the operating-lever is then shifted to the right until it may enter the slot 71; this brings the pawl 76 into meshing engagement with the ratchet-teeth 90, and the wheel is then lifted by moving the operating-lever up and down in the slot 71. As will be understood, the pawl 95 will prevent the retrogression of the rack-member during its idle, or downward, stroke. As stated before, this direct connection between the operating-lever and the rack-member is only possible for lifting the comparatively small weight of the latter and the spare-wheel.

For raising the whole rear end of the automobile, as in changing tires, a much greater power may be exerted by means of the following gear-mechanism: In alignment with the pawl 77 is keyed upon a shaft 104, running in bearings 105 provided in the stationary housing 106, the large ratchet-gear 107 on the shaft of which is fastened a small gear 108 which drives another gear 109 secured at one end of the shaft 110 running in a bearing 111 provided in the stationary-housing. This last mentioned gear is in constant engagement with the rack 91 and by it the rack-member may be lowered or raised, the latter being guided in these movements by the guide-rails 112 cast on the stationary-housing.

As will be readily understood, any further downward movement of the rack member or the spare-wheel, after it rests on the ground, will produce a reaction which lifts the rear end of the automobile off the ground. In order to obtain this effect, it is however necessary to disengage the pawl 95 from its ratchet-teeth 93, to permit the further downward movement of the rack-member, and to engage the pawl 96 with the ratchet-teeth 94 to prevent the retrogression of the raised automobile during the idle stroke of the operating-lever 59, which by this time has been shifted into the slot 70 so that the pawl 77 engages the ratchet-gear 107.

In Fig. 13 is suggestively indicated a simple method of operating the first described device by means of the automobile engine. This may be effected by fastening to the end of the pump-shaft 113 a bevel gear 114 which meshes with a similar gear 115 keyed at the lower end of the vertical shaft 116 running in suitable bearings 117 mounted in any desired fashion upon the engine. At the upper end of this shaft is keyed a bevel gear 118 which is flanked by two smaller and identical bevel-gears 119 and 120 secured on a horizontal shaft 121 a sufficient distance apart to allow the disengagement in full of the gear 118. The shaft 121 runs in bearings 122 and 123 and is provided at one end with a pull-knob 124 whereby it may be pushed longitudinally to effect the engagement of the gears 119, 120 with the large gear 118 or disconnect the latter completely. In order to maintain this shaft in the selected position, there are provided thereon two spaced collars 125 and 126 which may be engaged by a lever 127, fulcrumed on a pin 128. As will be seen from Fig. 13, when this lever engages the right hand side of the collar 125, the gear 120 will be kept in mesh with the gear 118, and when said shaft is pulled out so that the lever engages the left hand side of the collar 126 the gear 119 will mesh with the gear 118. When the lever occupies the intermediate space 129, the gear 118 is completely disconnected and the shaft 121 remains stationary.

The power required to operate the spare-wheel lifting mechanism is transmitted to the operating-shaft 130 by means of the sprocket 131 secured on the shaft 121, the drive-chain 132 and the sprocket 133 keyed on the operating-shaft. The various other parts of the mechanism shown in this figure, being identical to those shown in Figs. 2 and 3, have been identified by the same numerals.

The modified construction shown in Figs. 14 to 18 differs from the ones above described in that the raising or lowering of the spare-wheel is adapted to be operated locally rather than from the seat of the automobile. This construction consists of a substantially L-shaped stationary rack-member 134 which is secured on the body of the automobile by means of bolts inserted in apertures 135 and which possesses two longitudinal guide-rails 136 which are engaged by suitable grooves 137 cut in the movable gear-housing 138. On the outward face of the latter there is cast a hollow spindle 139 upon which the spare-wheel 1 is removably secured by means of its hub and a wing-lock-nut 140 engaging suitable threads 141 cut on said spindle.

The operating mechanism comprises an operating-shaft 142 which is rotatably and slidably mounted in the hollow spindle 139 and the interior bearing 143 formed integrally with the gear-housing 138. The outer end 144 of this shaft is preferably shaped to accommodate and be turned by the starting-crank 145 usually supplied with all automobiles. Upon said shaft is also keyed a gear 146 which is adapted to mesh with the teeth of the stationary-rack 147, as well as with a large gear 148 fastened on the intermediate shaft 149 which runs in the bearings 150 and 151 and upon which is also keyed a smaller gear 152. The latter is in permanent engagement with a large gear 153 securely mounted on the lower shaft 154, journaled in the bearings 155 and 156, and carrying a smaller gear 157 which is always in mesh with the rack 147.

When the spare-wheel is to be raised or lowered rapidly, the operating-shaft 142 is slid in its bearings so that the gear 146 engages the rack 147 and the operating-crank 145 is revolved which causes the latter, as well as the spare-wheel, to rise or drop, as the case may be. To obtain the greater power required to lift the rear end of the automobile, the operating-shaft 142 is pushed in so that the gear 146 leaves the rack 147 to come into meshing engagement with the large gear 148 whereby the last gear 157 is rotated at greatly reduced speed and correspondingly increased power on account of the intervening reducing-gearing.

In order to maintain the operating-shaft in the selected axial position during its rotation, there are suitably located thereon two peripheral grooves 158 and 159 which may be engaged by a tangential pin 160 inserted in a drilled aperture 161 provided in the hub 139. This pin is also used to lock the operating mechanism in any desired position by providing on the hub 139 a diametral aperture 162 and on the operating-shaft the adequately spaced diametral apertures 163 and 164. When either one of these last named apertures is brought to register with the aperture 162, the pin 160 is inserted therethrough and the operating-shaft is positively locked longitudinally.

If desired, the vertically movable spare-wheel carrying member of any one of the constructions above described may be provided with pedestals or legs adapted to reach slightly lower than the tire of the spare-wheel for the purpose of relieving the latter of the load of the automobile, when repairing the rear tires therof. In Figs. 14 and 15, the housing 138 is supplied on both sides with parallel lugs 165 between which are pivotally mounted the supporting legs 166, the feet 167 of which are preferably enlarged and provided with protuberances 168 to prevent slipping. When not in use, these legs may be folded up, as shown in dot and dash lines in Fig. 14, in which position they may be held by any suitable and desired device, such as the spring-catches 169, secured to the sides of said housing at the proper height.

In addition to the primary function as supports, these legs may also be used, (especially in the constructions operated from the driver's seat) as anti-skidding and general road-breaking means when driving down steep and slippery roads. Moreover, they also act as locking means to prevent the theft of a parked automobile. In the absence of said legs, the above functions can also be performed by the spare-wheel, although the wear thereon militates against such use. An especial advantage of the movable spare wheel supporting gear housing is that it not only elevates the driving tires from the ground but also lifts the spare tire, so that all may be easily removed.

Referring to Fig. 1, the necessary operations required to park an automobile in the narrow space shown therein, may be succinctly stated as follows: The space is first approached at an angle shown in dotted lines, until the front wheel nearest the curb nearly touches the latter. The front wheels are then turned around more or less parallel to the curb, after which the spare wheel is dropped to the ground and the rear-end of the car raised. This end is now pushed around by hand, using the front wheels as pivots and the spare-wheel as the rear wheel, until the automobile is nested in its narrow berth. The rear end may now be dropped to the ground, if desired. Of course, the spare-wheel may also be used to extricate an automobile out of a crowded parking place in a manner that should be understood without elaboration.

As will be understood, as suggested herein, there may be various changes made in the construction and arrangement of the details (which in the present drawings have been generally shown in exaggerated proportions for the sake of greater clearness,) of the present invention without departing from the field and scope of the same, and I intend to include all such variations, as fall within the scope of the appended claims, in this application in which the preferred forms only of my invention have been disclosed.

In the claims, it is to be understood that the expression "spare-wheel" used therein refers to a wheel of substantially the same type and size as the running-wheels of the vehicle and adapted to replace either one of said wheels.

I claim:

1. In combination with a vehicle, a spare-wheel of the character described; a support therefor positioned at the rear end of said vehicle and means to raise and lower said wheel while on said support away from and into supporting engagement with the ground with said support.

2. In combination with a vehicle, a spare-wheel of the character described; a vertically movable support therefor; stationary guiding means for said support positioned at the rear end of said vehicle, and means to raise and lower said support away from and into supporting engagement with the ground while carrying said wheel.

3. In combination with a vehicle, a spare-wheel of the character described; a vertically movable support therefor; stationary guiding means for said support positioned at the rear end of said vehicle; means to raise and lower said support away from and into supporting engagement with the ground while carrying said wheel, and means to lock said support in any selected position.

4. In combination with a vehicle, a spare-wheel of the character described; a vertically movable support therefor; stationary guiding means for said support positioned at the rear end of said vehicle; means operable from the seat of said vehicle to raise and lower said support away from and into supporting engagement with the ground while carrying said wheel, and means to lock said support in any selected position.

5. In combination with a vehicle, a spare-wheel of the character described; a vertically movable support therefor; stationary guiding means for said support positioned at the rear end of said vehicle; means operable from the seat of said vehicle to raise and lower said support away from and into supporting engagement with the ground while carrying said wheel, and means also operable from the seat to lock said support in any selected position and unlock same therefrom.

6. In combination with a vehicle, a spare-wheel of the character described; a vertically movable support therefor; stationary guiding means for said support positioned at the rear end of said vehicle; means to raise and lower said wheel support off and to the ground operable to raise the rear end of said vehicle off the ground, and means to lock said wheel support and rear end in any selected position.

7. In combination with a vehicle, a spare-wheel of the character described; a vertically movable support therefor; cooperating guiding means for said support positioned at the rear end of said vehicle and in supporting connection therewith; means to raise and lower said support away from and into supporting engagement with the ground while carrying said wheel, and means to lock said support in any selected position.

8. In combination with a vehicle, a spare-wheel of the character described; a vertically movable support therefor; cooperating guiding means for said support positioned at the rear end of said vehicle and in supporting connection therewith; means to raise and lower said support away from and into supporting engagement with the ground while carrying said wheel; means to lock said support in any selected position, and hand operated means to unlock same.

9. In combination with a vehicle, a spare-wheel of the character described; a vertically movable support therefor; stationary guiding means for said support positioned at the rear end of said vehicle; a train of gears adapted to raise and lower said support and wheel; means to change the gear ratio of said train of gears, and hand operated means to operate said train of gears.

10. In combination with a vehicle, a spare-wheel of the character described; a vertically movable support therefor; stationary guiding means for said support positioned at the rear end of said vehicle; a train of gears adapted to raise and lower said support and wheel, and unitary means to change the gear ratio of said gears and operate same.

11. In combination with a vehicle, a spare-wheel of the character described; a vertically movable support therefor; stationary guiding means for said support positioned at the rear end of said vehicle; a train of gears adapted to raise and lower said support and wheel, and unitary means to change the gear ratio of said train of gears and operate same from the seat of said vehicle.

12. In combination with a vehicle, a spare-wheel of the character described; a support therefor; a stationary guide for said support positioned at the rear end of said vehicle; a rack positioned on said guide; an operating-shaft mounted for rotation in said support; a gear positioned on said shaft and adapted to engage said rack, and means to rotate said shaft to raise and lower said support and wheel along said guide.

13. In combination with a vehicle, a spare-wheel of the character described; a support therefor; a stationary guide for said support positioned at the rear end of said vehicle; a rack positioned on said guide; an operating-shaft mounted for rotation in said support; a drive-gear positioned on said shaft; a train of gears positioned in said support and having its last gear in mesh with said rack; and means to connect said drive-gear with said rack or with said train of gears to raise and lower said support and wheel.

14. In combination with a vehicle, a spare-wheel of the character described; a support therefor; a stationary guide for said support positioned at the rear end of said vehicle; a rack positioned on said guide; an operating-shaft mounted for rotation in said support; a drive-gear positioned on said shaft; a train of gears positioned in said support and having its last gear in mesh with said rack; means to connect said drive-gear with said rack or with said train of gears to raise and lower said support and wheel along said guide, and means to secure said drive-gear into the selected engagement.

15. In combination with a vehicle, a spare-wheel of the character described; a support therefor; a stationary guide for said support positioned at the rear end of said vehicle; a rack positioned on said guide; an operating-shaft mounted for rotation in said support; a drive-gear positioned on said shaft; a train of gears positioned in said support and having its last gear in mesh with said rack; means to connect said drive-gear with said rack or with said train of gears to raise and lower said support and wheel along said guide, and removable means to secure said support and wheel in any selected position.

16. In combination with a vehicle, a spare tire; a vertically movable support therefor; stationary guiding means for said support positioned at the rear end of said vehicle; a train of gears adapted to raise and lower said support and wheel, and means to change the gear ratio of said gears and operate same.

17. The combination with an automobile, of means on the automobile for supporting a spare wheel and provided with a ground-engaging portion, and means for actuating said supporting means to cause said portion to be moved into engagement with the ground and to lift the wheels of said automobile out of engagement with the ground.

18. The combination with an automobile, of means on the automobile for supporting a spare wheel on an axis extending lengthwise of said automobile, said supporting means being provided with ground-engaging portions, and means for actuating said supporting means to cause said portions to be moved into engagement with the ground and to lift the wheels of said automobile out of engagement with the ground.

19. The combination with an automobile, of a wheel supporting member mounted on said automobile for vertical movement relatively thereto and having means for rotatably supporting a spare wheel on an axis extending lengthwise of said automobile and also provided with ground-engaging portions, and means for actuating said wheel supporting member to move said ground-engaging portions into contact with the ground.

20. The combination with an automobile, of a structure mounted on said automobile and adapted to support a spare tire for rotation about an axis extending lengthwise of said automobile, said structure having downwardly extending ground-engaging portions, and means for imparting movement to said structure to cause said portions to engage the ground and lift the wheels of said automobile out of engagement therewith.

21. The combination with an automobile, of a structure on said automobile and adapted to support a spare tire for rotation about an axis extending lengthwise of said automobile, said structure having downwardly extending adjustably mounted ground-engaging portions, and means for imparting movement to said structure to cause said portions to engage the ground and lift the wheels of said automobile out of engagement therewith.

In testimony whereof I affix my signature.

JOSEPH E. DESMOND.